US012812190B2

(12) United States Patent
Chen et al.

(10) Patent No.: US 12,812,190 B2
(45) Date of Patent: Nov. 24, 2026

(54) UNIFIED VIDEO QUALITY SCORE ASSESSMENT USING FUZZY LOGIC

(71) Applicants: Disney Enterprises, Inc., Burbank, CA (US); HULU, LLC, Santa Monica, CA (US); Beijing YoJaJa Software Technology Development Co., Ltd., Beijing (CN)

(72) Inventors: Si Chen, Beijing (CN); Wenhao Zhang, Beijing (CN); Tongyu Dai, Beijing (CN); Thomas Howe, Chicago, IL (US); Nicholas Brookins, Santa Monica, CA (US)

(73) Assignees: Disney Enterprises, Inc., Burbank, CA (US); HULU, LLC, Santa Monica, CA (US); Beijing YojaJa Software Technology Development Co., Ltd., Beijing (CN)

( * ) Notice: Subject to any disclaimer, the term of this patent is extended or adjusted under 35 U.S.C. 154(b) by 2 days.

(21) Appl. No.: 19/067,060

(22) Filed: Feb. 28, 2025

(65) Prior Publication Data

US 2026/0261722 A1 Sep. 3, 2026

(51) Int. Cl.

*H04N 21/24* (2011.01)
*G06N 7/02* (2006.01)
*H04N 21/25* (2011.01)

(52) U.S. Cl.

CPC ........... *H04N 21/2402* (2013.01); *G06N 7/02* (2013.01); *H04N 21/251* (2013.01)

(58) Field of Classification Search

CPC ..... H04N 21/2402; H04N 21/251; G06N 7/02
See application file for complete search history.

(56) References Cited

U.S. PATENT DOCUMENTS 11,962,781 B2 4/2024 Zeng et al.
2021/0152892 A1* 5/2021 Ramaswamy ... H04N 21/64738
2023/0319327 A1* 10/2023 Wang .................. H04N 21/234

FOREIGN PATENT DOCUMENTS

WO 0104769 A2 1/2001
WO 0104769 A3 1/2001

OTHER PUBLICATIONS

Extended European Search Report, EP Patent Application No. 25208745.7, European Patent Office, mailed Jan. 15, 2026, 9 pages.

(Continued)

*Primary Examiner* — Anthony Bantamoi
(74) *Attorney, Agent, or Firm* — Kwan & Olynick LLP

(57) ABSTRACT

In some embodiments, a method receives a plurality of metric values for quality of service based on delivering content in a content delivery system. Respective metric values into a fuzzy value in a plurality of possible fuzzy values where a plurality of fuzzy values is determined. The method determines a plurality of fuzzy rules where a fuzzy rule is associated with a fuzzy value. Respective conditions for fuzzy rules are applied to the plurality of fuzzy values to determine fuzzy rules that have conditions met. A fuzzy rule applies when respective conditions for the fuzzy rule are met by one or more fuzzy values in the plurality of fuzzy values. A fuzzy output is determined from fuzzy values that are associated with the fuzzy rules that have conditions met. A unified quality score is calculated from the fuzzy output. The method outputs the unified quality score.

20 Claims, 6 Drawing Sheets

(56) References Cited

OTHER PUBLICATIONS

Farid Farnaz et al: "A Fuzzy Logic Approach for Quality of Service Quantification in Wireless and Mobile Networks", 39th Annual IEEE Conference on Local Computer Networks Workshops, Sep. 8, 2014 (Sep. 8, 2014), 8 pages.

Jeevan Pokhrel et al: "Estimation of QoE of Video Traffic Using a Fuzzy Expert System", Consumer Communications and Networking Conference (CCNC), 2013 IEEE, Jan. 11, 2013 (Jan. 11, 2013), pp. 224-229.

Samet Nouha et al: "Adaptive Cloud-Based Mobile Video Streaming Service Using Real-Time QoE Estimation", 2024 International Wireless Communications and Mobile Computing (IWCMC), IEEE, May 27, 2024 (May 27, 2024), pp. 1309-1314.

"Overall Viewer Experience", downloaded from https://www.mux.com/docs/guides/data-overall-viewer-experience-metric, on Feb. 28, 2025, 4 pages.

Jon Dahl, "Changes to the Mux Viewer Experience Score", Oct. 1, 2018, 16 pages.

* cited by examiner

UNIFIED VIDEO QUALITY SCORE ASSESSMENT USING FUZZY LOGIC

BACKGROUND

Numerous metrics may be used to evaluate streaming performance. Current approaches include limitations. For example, a single quality of service (QoS) metric may be used, such as average bitrate, to evaluate video quality. However, this metric may not accurately evaluate the quality of experience. Also, different methods of aggregating several quality of service metrics into a score may not be able to capture the quality of experience being experienced by viewers. Previous solutions have often produced discrete or binary outcomes, which can result in significant score fluctuations near threshold values and potential inaccuracies. Furthermore, these methods assume linear relationships between all influencing factors and the final outcome, resulting in potentially inaccurate evaluations. These scores may not accurately reflect subtle changes in quality of service metrics, leading to an unreliable assessment of overall streaming quality as would be experienced by a viewer.

BRIEF DESCRIPTION OF THE DRAWINGS

The included drawings are for illustrative purposes and serve only to provide examples of possible structures and operations for the disclosed inventive systems, apparatus, methods, and computer program products. These drawings in no way limit any changes in form and detail that may be made by one skilled in the art without departing from the spirit and scope of the disclosed implementations.

DETAILED DESCRIPTION

Figure 1:
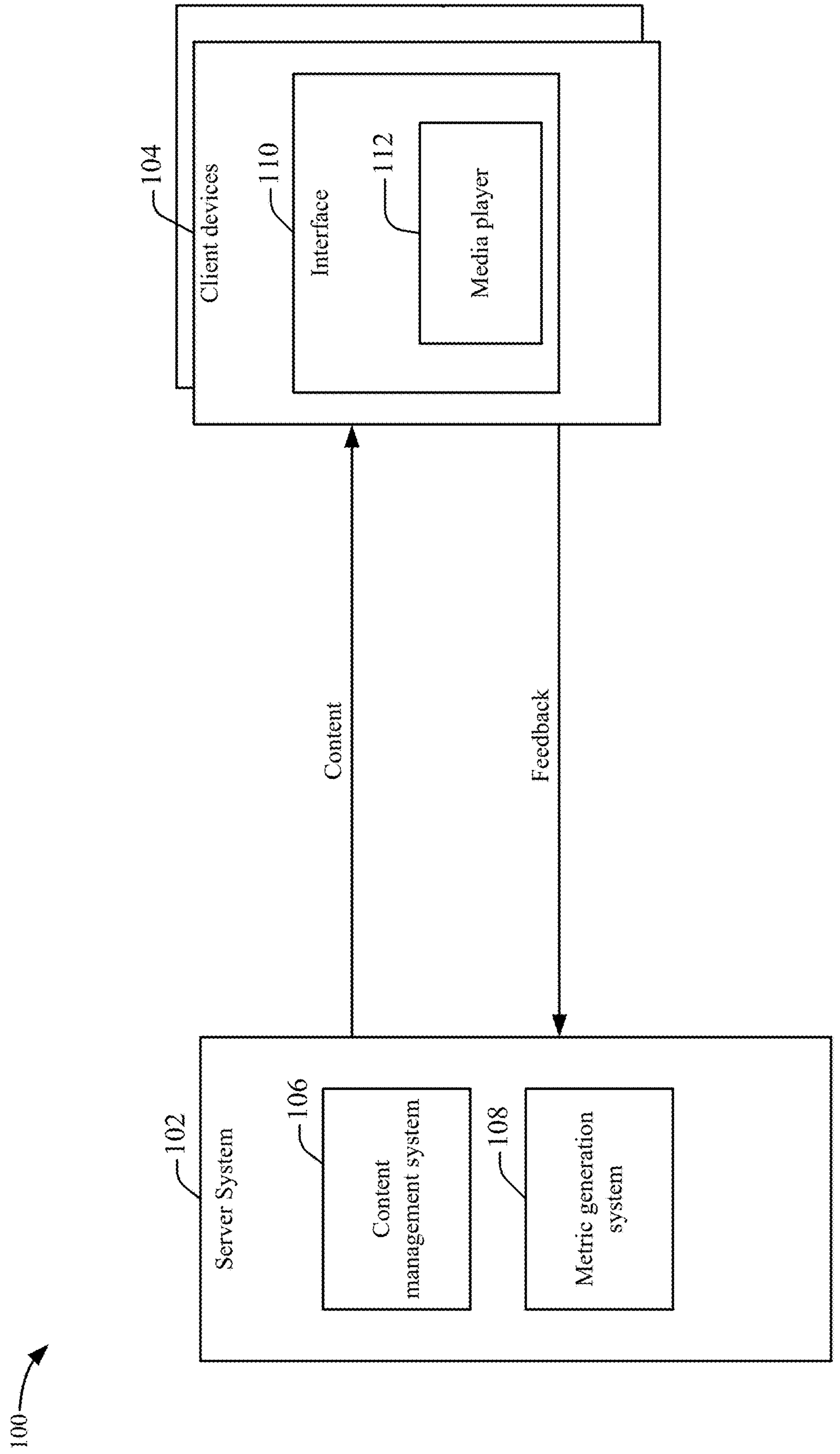
FIG. 1 depicts a simplified system for generating a unified quality score according to some embodiments.

Described herein are techniques for a content delivery system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

A system uses fuzzy logic to evaluate quality of service metrics based on the delivery of content, and provides a unified quality score that quantifies a quality of experience (QoE). A quality of experience that is observed by both individual viewers and experienced evaluators has an intuitive yet vague standard for assessing overall streaming quality. For instance, a session with smooth and high-quality playback is generally deemed a good experience, while a session with slight stuttering but high clarity might be considered acceptable. The system bridges the gap between subjective user perceptions and objective measurements by leveraging fuzzy logic that captures common observations and experiences to convert vague judgments of quality of service (QoS) metrics into accurate numerical evaluations.

The system integrates various quality of service metrics, such as video startup time, rebuffer ratio, rebuffer count, and average bitrate, into a unified quality score. The unified quality score provides a single, comprehensive measure of quality of experience. The unified quality score enables the identification of and dynamic adjustment of systems to enhance the overall user experience. Analyzing all the quality of service metrics directly to evaluate quality of experience may be challenging because the quality of service metrics are numerous, dynamic, and fluctuate over time. Additionally, tradeoffs between metrics make it difficult to assess overall performance—for example, increasing bitrate may improve video quality but also lead to more rebuffering. Monitoring all metrics and identifying issues in real time becomes highly complex. The unified quality score addresses this by aggregating the quality of service metrics using a defined logic, balancing tradeoffs to provide a single, comprehensive measure of the overall quality of experience. This simplifies monitoring and allows trends in the unified score to indicate when and where adjustments are needed. The unified quality score can be monitored for trends, such as a downward trend, which can then be used to identify issues, such as encoding issues or network delivery issues.

The fuzzy logic-based solution differs from previous approaches in its ability to represent and process quality of service metrics in a more nuanced and continuous manner, allowing for human-like reasoning and decision-making. This results in a more accurate and reliable assessment of quality of experience, which can be easily adapted to different quality of service metrics and delivery conditions without requiring extensive computational resources or significant modifications to the existing framework. The fuzzy logic may use less computing resources compared to processing of all the quality of service metrics using rules.

The unified quality score includes many advantages. For example, the unified quality score provides a continuous and accurate evaluation of quality of experience. Also, the unified quality score has improved scalability and adaptability to different quality of service metrics and delivery conditions. The unified quality score has enhanced ability to identify areas for adjustment and improvement to optimize the user experience due to its continuous nature as compared to binary outcomes. Also, the unified quality score reduces subjectivity and complexity in evaluating quality of experience due to using fuzzy logic instead of subjective observations by humans.

In some embodiments, the system includes a fuzzifier system, a fuzzy rule system, a defuzzifier system, and an adjustment system. The fuzzifier system may transform an input of multiple quality of service metric values into fuzzy values that represent human thinking. The output of the fuzzifier may be fuzzy values. The fuzzy rule system may receive the fuzzy values and apply fuzzy rules to the fuzzy values. The fuzzy rule system generates a fuzzy output. Then, a defuzzifier system converts the fuzzy output to a unified quality score. The unified quality score may be a definite numerical value or category. Then, an adjustment system may use the unified quality score to perform adjustments to a system.

System

FIG. 1 depicts a simplified system 100 for generating a unified quality score according to some embodiments. System 100 includes a server system 102 and client devices 104. Although a single instance of server system 102 is shown, multiple instances of server system 102 may be appreciated. For example, multiple client devices 104 may be requesting content from a single server system 102 or multiple server systems 102.

Server system 102 includes a content management system 106 that may facilitate the delivery of content to client device 104. For example, content management system 106 may communicate with content delivery networks (not shown) to have content delivered to multiple client devices 104. A content delivery network includes servers that can deliver content to client device 104. The content may be video, audio, or other types of content. Video may be used for discussion purposes, but other types of content may be used in place of video. In some embodiments, a content delivery network delivers segments of video to client device 104. The segments may be a portion of the video, such as six seconds of the video. A video may be encoded in multiple profile levels that correspond to different levels, which may be different levels of bitrates or quality (e.g., resolution). Client device 104 may request a segment of video from one of the profile levels based on current network conditions. For example, client device 104 may use an adaptive bitrate algorithm to select the profile level for the video based on the estimated current available bandwidth and other network conditions.

Client devices 104 may include a mobile phone, smartphone, set top box, television, living room device, tablet device, or other computing devices. Client devices 104 may include a media player 112 that is displayed on an interface 110. Media player 112 or client device 104 may request content from the content delivery network.

A metric generation system 108 receives feedback from the delivery of content to client devices 104. Metric generation system 108 determines quality of service metrics, such as video startup time, rebuffer ratio/rebuffer count, and average bitrate, from the feedback. Metric generation system 108 uses the input to evaluate the quality of experience. Quality of experience may be the evaluation of the perceived quality that a user experiences when content is delivered to client devices 104. Quality of service may be metrics that are based on the delivery of the content to client devices 104.

Metric generation system 108 may use fuzzy logic to translate evaluations of quality of service metrics and overall viewing quality into the unified streaming quality assessment metric score (referred to as a unified quality score). For example, the fuzzy logic allows the quality of service metrics to be fit into vague human like standards for assessing overall quality of experience, and then be converted into a numerical assessment of the unified quality score. The unified quality score may be different from previous solutions that rely on rule-based methods or mathematical models using linear weightings. The use of fuzzy logic to represent and process quality of service metrics allows for a more nuanced and continuous evaluation of quality of experience based on human-like reasoning. This may result in a unified quality score that may be more realistic to use to perform adjustments to systems in the delivery of content. As described above, quality of service metrics are dynamic, and fluctuate over time, making it challenging to evaluate overall system performance directly. Additionally, there are inherent tradeoffs between metrics—for example, increasing bitrate may improve video quality but could lead to more rebuffering. When one metric improves while another degrades, it becomes difficult to determine whether the system is performing normally or encountering issues. The unified quality score is a unified metric that provides a comprehensive and balanced representation of quality of experience. The unified quality score simplifies the complexity of monitoring numerous fluctuating quality of service metrics and resolves tradeoffs between them.

In some embodiments, metric generation system 108 may use quality of service metrics for multiple client devices 104 to generate the unified quality score. However, the unified quality score may be generated for a single client device 104.

The following will now describe the fuzzy logic in more detail.

Fuzzy Logic System

Figure 2:
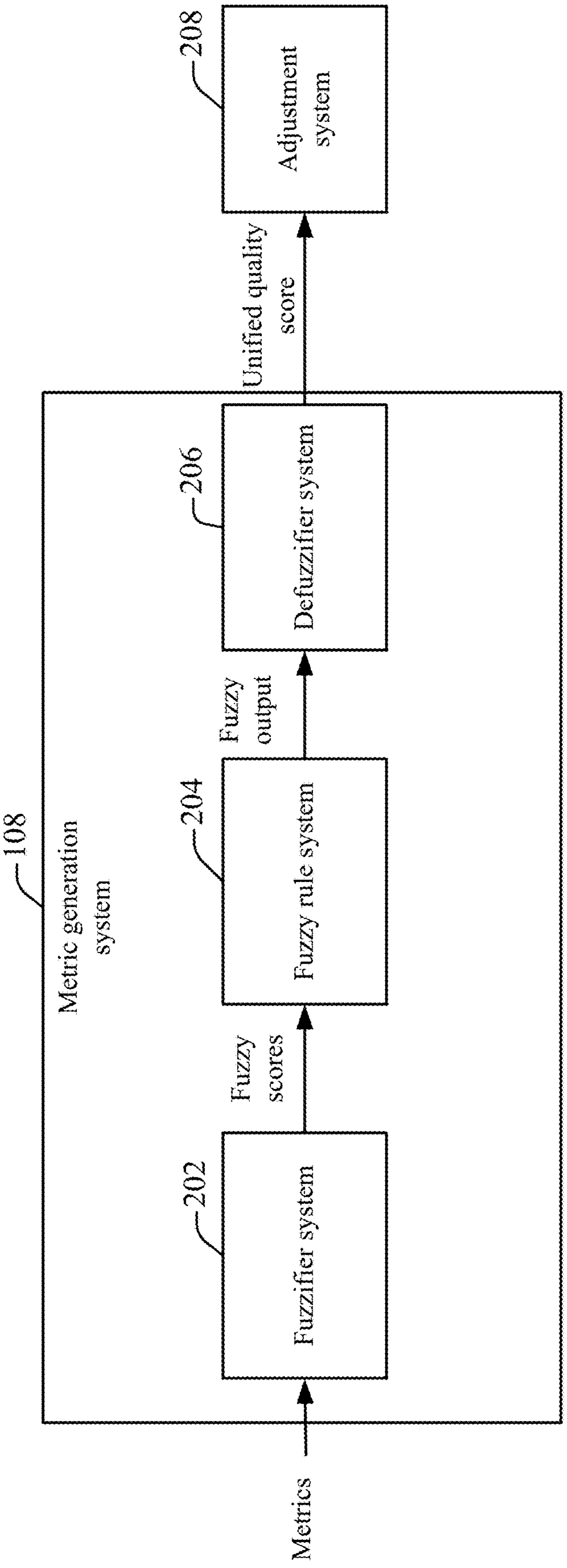
FIG. 2 depicts a more detailed example of a metric generation system according to some embodiments.

FIG. 2 depicts a more detailed example of metric generation system 108 according to some embodiments. A fuzzifier system 202 receives quality of service metrics as an input. The quality of service metrics may describe metrics that are based on the delivery of the content to one or more client devices 104. The following quality of service metrics may be used, but other metrics may be appreciated. For example, the quality of service metrics may include rebuffer metrics, video quality metrics, response time metrics, video start failure metrics, video playback failure metrics, or other metrics.

Rebuffers may impact quality of experience from different perspectives. For example, the frequency of buffering events and the duration of buffering events may affect quality of experience. Frequent rebuffers interrupt the continuous playback of the content, causing interruptions in the viewing experience. Users expect a smooth, uninterrupted delivery of content, and frequent rebuffering events can lead to frustration and dissatisfaction. The duration of rebuffering events directly impacts quality of experience. Short pauses may be tolerable, but longer interruptions disrupt the flow of the content delivery and viewing and reduce user satisfaction. Rebuffer-related metrics may include rebuffer frequency, rebuffer count, rebuffer duration, etc.

Assessing the impact of video quality on quality of experience is important. Different video quality evaluation methods may be used, such as peak to noise signal ratio (PSNR), structural similarity index measure (SSIM), video multi-method assessment fusion (VMAF), etc.

Different metrics for response time may also be used. Video startup time (VST) may be the initial load time may be the time it takes for content to start after a user initiates playback. A shorter video startup time creates a positive first impression, whereas a longer video startup time can lead to user frustration and potential abandonment of the stream. Interaction delay is a quick response to user interactions, such as pausing, seeking, or changing settings, and enhances the user's sense of control and satisfaction. Delays in these responses can disrupt the viewing experience and lead to negative perceptions of the service's responsiveness.

Video start failure measures a number of failures that result when starting playback of content. Also, video playback failure measures a number of failures that result when playing back content.

Fuzzifier system 202 may transform a complex and unknown mathematical problem into fuzzy human thinking. Unlike binary logic, which converts inputs into a "0" or "1", fuzzy logic represents the transition states between input values using membership degrees. Fuzzifier system 202 converts the input into an output of a fuzzy language. To determine the output, a fuzzy language or membership function may be used.

Fuzzy language refers to linguistic terms that describe a variable's state in a qualitative manner, rather than using precise numerical values. In fuzzy logic, input variables are categorized into different fuzzy sets such as "low," "medium," or "high" instead of using exact numbers. For example, instead of stating that the temperature is exactly 30° C., fuzzy language describes it as "warm" or "slightly hot." This approach reflects human reasoning, where judgments are often made in approximate terms. The human reasoning may convert quality of service metrics into fuzzy values that approximate the human judgment of quality of experience.

The membership function defines how each input or output value is mapped to a membership degree within a fuzzy set, such as ranging from 0 to 1. The membership degree represents the extent to which a specific value belongs to a fuzzy value. For instance, in the case of temperature, a value of 30° C. might have a membership degree of 0.7 in the "warm" fuzzy value and 0.3 in the "hot" fuzzy value.

A fuzzy rule system 204 receives the fuzzy values from fuzzifier system 202. Fuzzy rule system 204 may apply fuzzy rules to the fuzzy values to generate a fuzzy output with membership degree. Fuzzy rules may be defined differently according to the evaluation of user experience. That is, the fuzzy rules may attempt to capture the evaluation of quality experience by users. In some embodiments, fuzzy rules may be of the format of conditions, such as "if A, then B". The fuzzy rule may apply when conditions of the rule is met. Other formats of fuzzy rules may also be used, such as the fuzzy rules may incorporate other operators, such as Boolean operators, to combine multiple conditions. The fuzzy rules may consider the fuzzy values and determine a fuzzy output with membership degree based on respective rules that apply to the fuzzy values. In some embodiments, the fuzzy output may be multiple fuzzy values with respective membership degrees. Fuzzy rule system 204 then outputs the fuzzy output. The determination of the fuzzy output will be described in more detail below.

A defuzzifier system 206 converts the fuzzy output into the unified quality score. Defuzzifier system 206 maps the fuzzy output to a definite numerical value or category for further processing. In some embodiments, the numerical value may be a continuous value within a range, such as from a range of 0 to 100. Alternatively, defuzzifier system 206 can map the output into specific categories, such as "System Running Well" or "Issue Detected," etc. to classify the fuzzy output. Defuzzifier system 206 may use the continuous value to determine one of the categories, or a membership in the categories. In contrast to a binary value of zero and one, the continuous value may provide more insight into the quality of experience. For example, instead of a zero or one, the unified quality score may be 20, 30, or 40 to define different granularities of a low quality of experience. Also, the unified quality score may be 70, 80, or 90 to define different granularities of a higher quality of experience. In contrast, the unified quality score of 20, 30, and 40 may have been classified with the value of zero and the unified quality score of 70, 80, and 90 may have been classified with the value of one.

An adjustment system 208 receives the unified quality score and may perform an adjustment to the delivery process. For example, as will be described below, adjustments in the delivery of content via content delivery networks, the encoding process, or to playback at client device 104 may be performed. In some embodiments, the adjustments may be performed dynamically after the unified quality score is received. These adjustments may improve the delivery of content. Also, the adjustments may be made with a finer granularity compared to receiving a binary value of zero or one. For example, different granularities of adjustments based on the unified quality score can be performed compared to only two adjustments when the output is zero or one.

Figure 3:
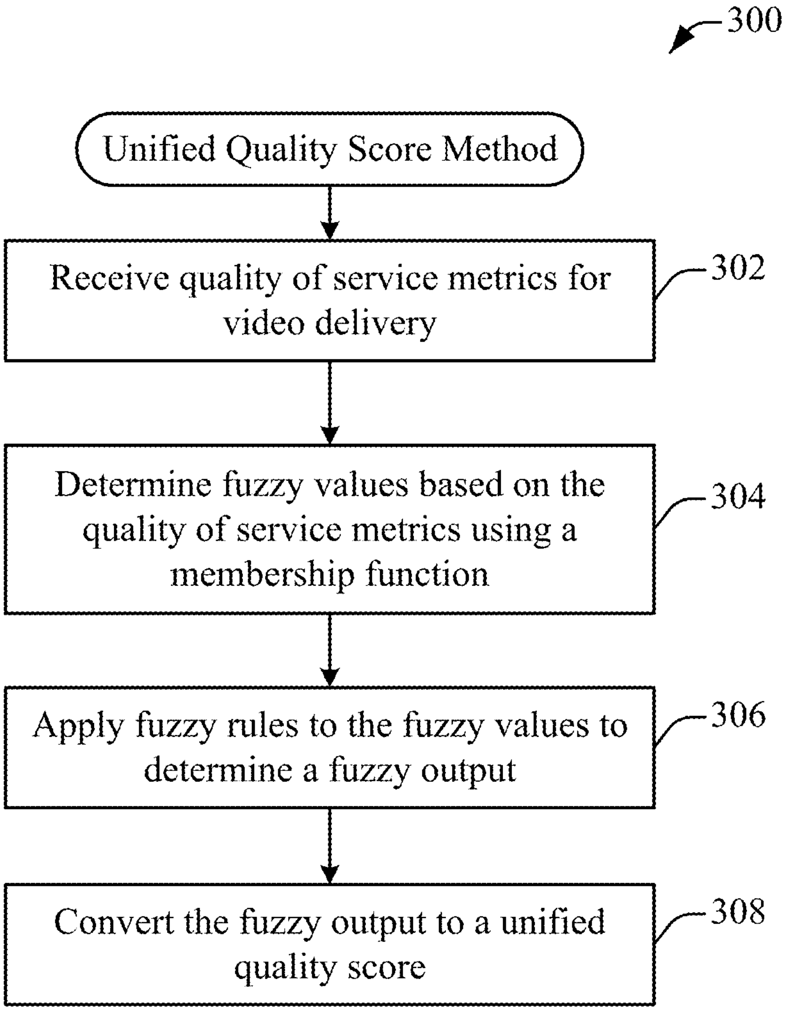
FIG. 3 depicts a simplified flowchart of a method for generating a unified quality score according to some embodiments.

The following will describe an example of generating a unified quality score in more detail. FIG. 3 depicts a simplified flowchart 300 of a method for generating a unified quality score according to some embodiments. At 302, fuzzifier 202 receives quality of service metrics for video delivery. In some embodiments, the quality of service metrics may be scores for different quality of service metrics that are received from delivering content to client devices 104. In some embodiments, the quality of service metrics may be classified in categories, such as rebuffer, video quality, response time, etc. For example, rebuffer-related metrics include rebuffer frequency, rebuffer count, rebuffer duration, and so on. Video quality-related metrics include PSNR, SSIM, VMAF, and so on. Then, the metrics within each category may be aggregated into a single score in a range, such as from 0 to 100. By using a single score, this may improve the processing efficiency because inputting all of the quality of service metrics into the fuzzy logic may cause a rule explosion within the fuzzy logic. Metric generation system 108 is aggregating many dimensions of inputs into a unified quality score. The aggregation of the quality of service metrics into a single score for categories, and then aggregating the category scores into a unified quality score may be performed to reduce the fuzzy logic that is required. In other embodiments, the aggregation into categories may not be performed. The aggregation of quality of service metrics into a category score may be performed in different ways, such as using fuzzy logic, weighted averaging, averaging, or other aggregation methods.

At 304, fuzzifier 202 determines fuzzy values based on the quality of service metrics using a membership function. Table 1 describes an example of a fuzzy language according to some embodiments.

TABLE 1

| Input and Output | Fuzzy values |
|---|---|
| Rebuffer Score | Low, Medium, High |
| Video Quality Score | Low, Medium, High |
| Fuzzy Output | Low, Medium, High |

The inputs in Table 1 include rebuffer score and video quality score. The output may be a fuzzy output. The fuzzy values may be low, medium, and high, but other values may be used. The fuzzy values do not need to be the same for all inputs or outputs; rather, different inputs and outputs may have different fuzzy values. The membership scores may indicate the percentage of membership of the input in each fuzzy value, such as a rebuffer score of 65 has a 0.0 membership score for low, 0.875 membership score for medium, and 0.125 membership score for high.

At 306, fuzzy rule system 204 applies fuzzy rules to the fuzzy values to determine a fuzzy output. Table 2 depicts an example of rules according to some embodiments.

TABLE 2

| Rule | | Fuzzy output |
|---|---|---|
| R1 | Rebuffer Score: High AND Video Quality Score: High | High |
| R2 | (Rebuffer Score: High AND Video Quality Score: Medium) OR (Rebuffer Score: Medium AND Video Quality Score: High) OR (Rebuffer Score: Medium AND Video Quality Score: Medium) | Medium |
| R3 | Rebuffer Score: Low OR Video Quality Score: Low | Low |

The rules R1, R2, and R3 describe different conditions that need to be met for the respective rule to apply. In some embodiments, one or more rules may apply depending on if the conditions are met. Also, only one rule may apply to the fuzzy values. The rules in this example may be if A, then B, where A is one or more conditions and B is the fuzzy output (e.g., of one of the fuzzy values). The conditions in this example may include Boolean operators that combine fuzzy values from different inputs. As will be discussed below, the degree of membership may be used to evaluate the rules.

At 308, defuzzifier 206 converts the fuzzy output to a unified quality score. Different methods of defuzzifying may be used. For example, defuzzifier 206 uses a method that combines the rules that apply and the degree of membership to determine the unified quality score. In some embodiments, defuzzifier 206 uses a centroid method that calculates the centroid of the fuzzy outputs with membership degree based on its shape and uses it as the defuzzified output. The centroid is calculated as the weighted average of the area between the fuzzy output curve and the horizontal axis. Also, defuzzifier 206 uses a maximum method that selects the x-coordinate of the highest point on the fuzzy output curve as the defuzzified output of the unified quality score. Further, defuzzifier 206 uses a weighted average method that multiplies each point on the fuzzy output curve by its corresponding weight and calculates the weighted average as the defuzzified output of the unified quality score. The weights can be determined based on the specific application requirements.

Example

The following will describe an example. The following may use the rebuffer score and video quality score as input for discussion purposes to describe the fuzzy logic to generate a unified quality score. However, other quality of service metrics scores may be used. The input may be a Rebuffer Score=65 and a Video Quality Score=65. Fuzzifier system 202 determines that membership of fuzzy values for each input. For example, Table 3 depicts the degree of membership for the fuzzy values.

TABLE 3

| | Degree of Membership for Rebuffer Score | Degree of Membership for Video Quality Score |
|---|---|---|
| Low | 0 | 0 |
| Medium | 0.875 | 0.875 |
| High | 0.125 | 0.125 |

Figure 4:
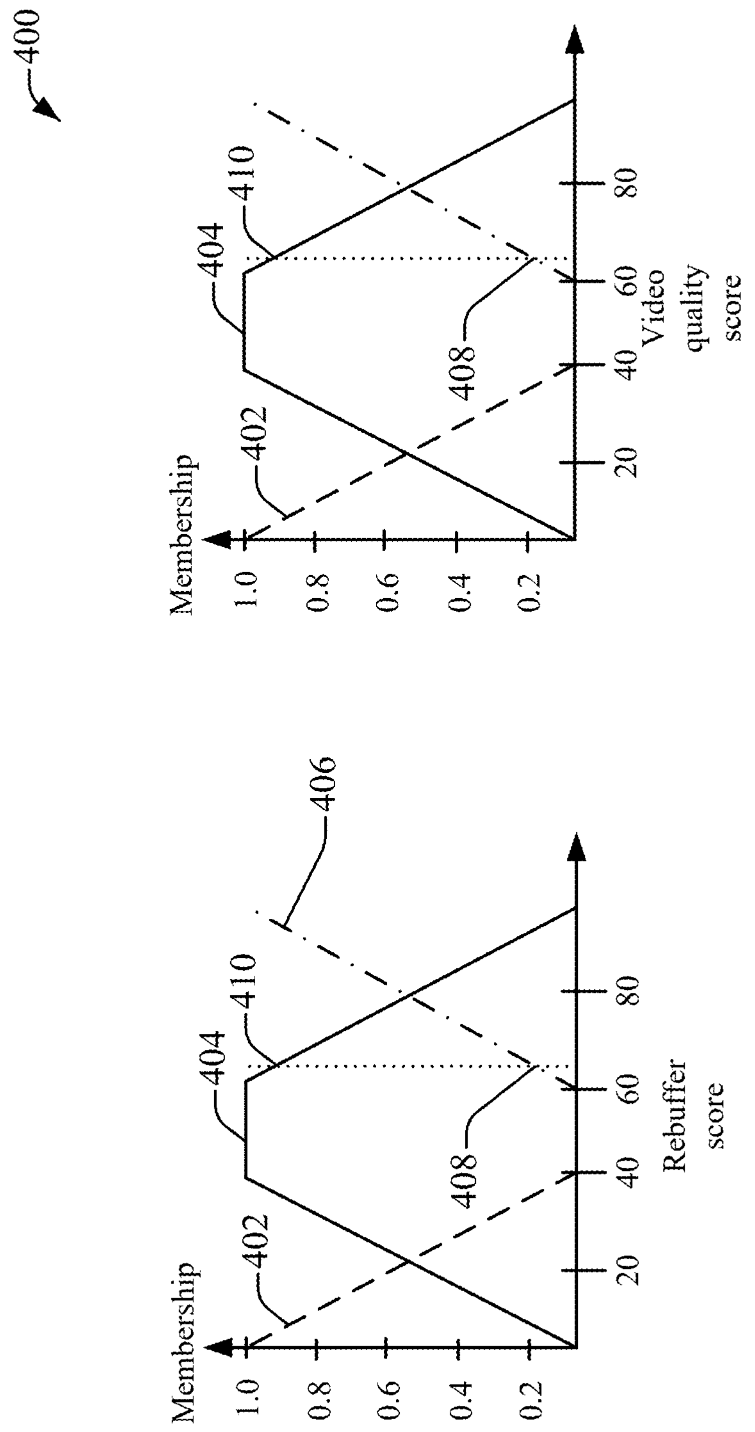
FIG. 4 depicts an example of a membership function according to some embodiments.

The degree of membership for the rebuffer score and video quality score is [0, 0.875, 0.125] for the low, medium, and high fuzzy values, respectively. To determine the membership degree, a membership function may be used. FIG. 4 depicts an example 400 of membership functions according to some embodiments. Each input may have a different membership function. In this example, both inputs have the same membership function, but the example is not restricted to using the same membership function where each input may have an associated different membership function.

The Y-axis shows the membership degree and the X-axis shows the score of the input. The fuzzy values may be represented by lines in the graph membership function. For example, at 402, the membership function for the low fuzzy value is shown in dashes; at 404, the membership function for the medium fuzzy value is shown with a solid line; and at 406, the membership function for the for the high fuzzy value is shown with dashes and dots. Depending on the value of the input, the fuzzy value may have different membership values for respective fuzzy values. For example, the value of 65 shows a value of 0.125 at 408 for the high fuzzy value and 0.875 at 410 for the medium fuzzy value. The low fuzzy value membership function is zero at the value of 65. This results in the values shown in Table 3.

Fuzzy rule system 204 uses the membership degree to determine the fuzzy output. Table 4 depicts the membership calculation of the fuzzy output.

TABLE 4

| | | Degree of Membership for Fuzzy Output |
|---|---|---|
| Rule 1 | min(0.125, 0.125) | High 0.125 |
| Rule 2 | max{min(0.125, 0.875), min(0.875, 0.125), min(0.875, 0.875)} | Medium 0.875 |

Based on the degree of membership of each input, rules 1 and 2 from Table 2 are met. Rule 1 includes conditions that the rebuffer score is high AND the video quality score is high. Rule 2 includes conditions where the rebuffer score is high AND the video quality score is medium OR the rebuffer score is Medium AND the video quality score is high OR the rebuffer score is medium AND the video quality score is medium. Rule 3 does not apply because the rebuffer score is not low and the video quality score is not low. The next step is to calculate the strength of each fuzzy rule. If the link among metrics in the rule condition is "AND", the minimum value method is used. If the link is "OR", the maximum value method is used. However, other methods of valuation may be used. This results in a minimum value of 0.125 for rule 1 for the high fuzzy value and a maximum value of 0.875 for the medium fuzzy value. The fuzzy output is 0.125 for high for rule 1 and 0.875 for medium for rule 2.

Defuzzifier system 206 then converts the fuzzy output to a unified quality score. Different methods may be used. Using the centroid method as an example, the unified quality score may be 50.25. The centroid method involves calculating a weighted average of the output values based on their membership degrees and then normalizing the result to obtain a numerical value within the range of possible output values.

Once determining the unified quality score, adjustments can be made to different systems.

Adjustments

Figure 5:
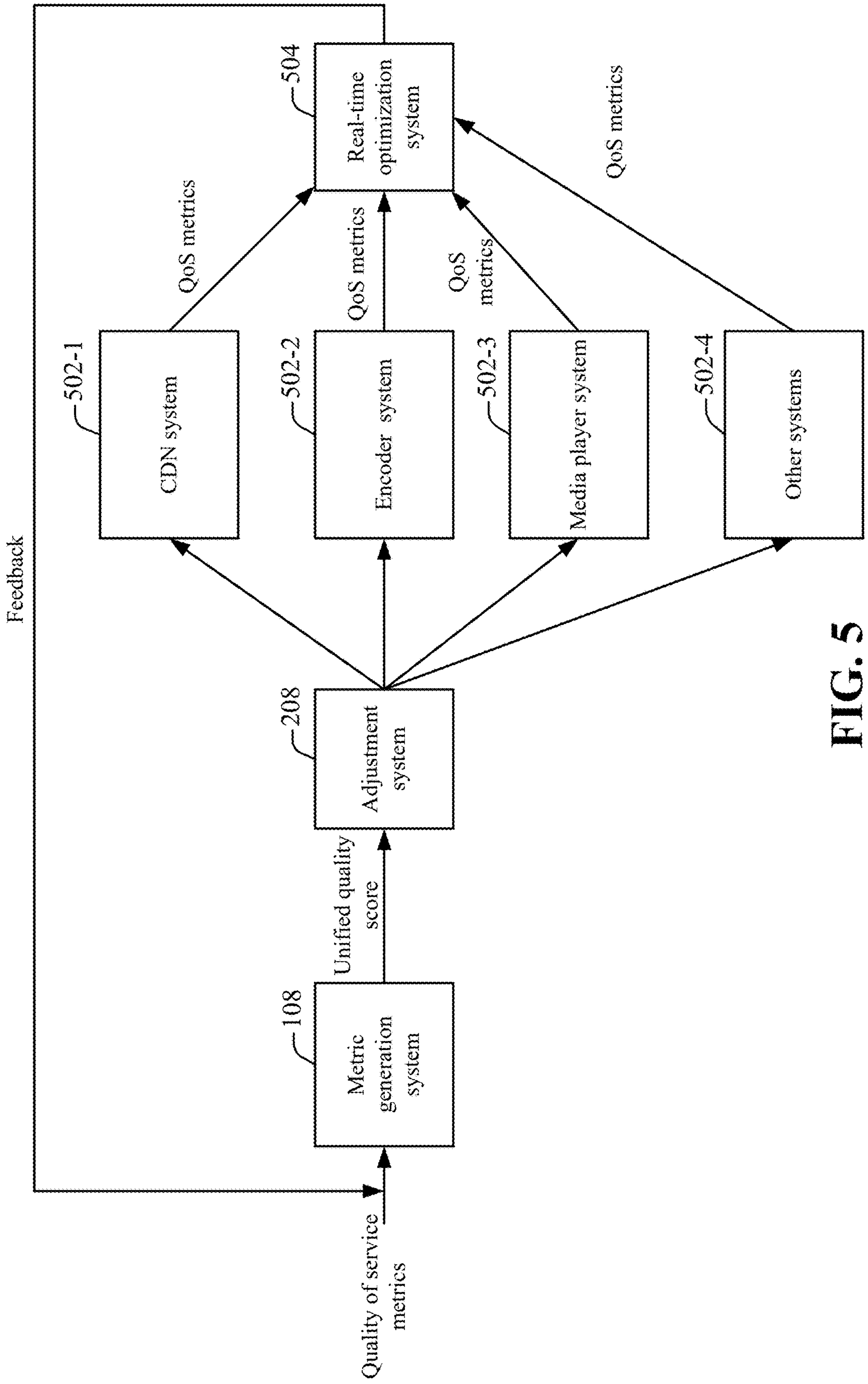
FIG. 5 depicts an example of performing adjustments based on the unified quality score according to some embodiments.

FIG. 5 depicts an example of performing adjustments based on the unified quality score according to some embodiments. As described above, quality of service metrics are received at metric generation system 108 and metric generation system 108 generates a unified quality score. Then, adjustment system 208 uses the unified quality score to perform an adjustment.

The following will describe some adjustments that can be made, but other adjustments may be appreciated. For example, adjustments may be made to a Content Delivery Network (CDN) system 502-1, an encoder system 502-2, a media player system 502-3, or other systems 502-4. Content delivery network System 502-1 may use the unified quality score to adjust content delivery strategies. For example, adjustment system 208 may adjust to use better performing servers or alter caching strategies based on the unified quality score. In some examples, a server that is associated with a better unified quality score may be used more often to deliver content. Also, a server with poor unified quality score may have more content cached added to reduce the retrieval times for content. In some examples, a unified quality score indicates degraded playback quality in a specific geographic region due to high latency from a content delivery network server. Adjustment system 208 may group content delivery networks by region and analyze quality of service metrics for the groups. Adjustment system 208 automatically redirects client devices in that region to a nearby less congested content delivery network server. This improves the content delivery by reducing latency and buffering to improve the overall quality of experience.

Adjustment system 208 may use the unified quality score to adjust encoding of content at encoder system 502-2. For example, adjustment system 208 may optimize encoding parameters, such as bitrate, resolution, or codec settings to balance quality and resource usage. For example, the unified quality scores indicate that the adoption rates of 4K and High Dynamic Range (HDR) playback are low in certain regions. The encoding bitrate for 4K and HDR content may be set too high for the average available network bandwidth in these areas. For example, if the unified quality score is consistently lower in certain regions where 4K and HDR content are available, adjustment system 208 can analyze quality of service metrics—such as bitrate, rebuffering, and session completion rates—to determine whether the high-bitrate 4K and HDR content is causing poor playback experiences due to bandwidth limitations.

Adjustment system 208 may adjust encoder settings to include supplementary lower bitrate 4K and HDR content streams as additional options. This ensures that more users in these regions can access and view 4K and HDR content, which enhances the quality of experience without requiring significant increases in bandwidth.

Adjustment system 208 may use the unified quality score to adjust media player settings at media player system 502-3. For example, adaptive bitrate algorithms may be adjusted to improve playback smoothness and responsiveness. For example, a low unified quality score may cause the adaptive bitrate algorithm to be less aggressive when switching to higher bitrates. Also, a higher unified quality score may cause the adaptive bitrate algorithm to be more aggressive to switch to higher bitrate profiles.

After making the adjustments, quality of service metrics are received at real-time optimization system 504, which provides the quality of service metrics as feedback to metric generation system 108 such that real-time adjustments may be made. For example, the feedback may be received that is used to determine new quality of service metrics. Then, the evaluation to determine a new unified quality score is performed and adjustment system 208 determines adjustments to one or more systems 502-1 to 502-4. Dynamic adjustments to the systems can thus be made.

CONCLUSION

The unified quality score may be generated based on a more nuanced and human-like evaluation of quality of service metrics. For example, instead of a strict threshold for video startup time, the unified quality score uses fuzzy sets to weight and interpret borderline cases more flexibly, providing a unified quality score that better reflects the overall user experience. The unified quality score may capture granular differences in playback quality across multiple quality of service dimensions. The unified quality score using fuzzy logic offers a more accurate and intuitive reflection of user experience.

Accordingly, metric generation system 108 uses fuzzy logic to approximate user judgments into a unified quality score. The use of fuzzy logic may approximate the judgments of users for a quality of experience. This provides a more accurate unified quality score. For example, the unified quality score provides continuous outputs. Unlike binary or discrete step change evaluations, the unified quality score provides a continuous quality score that ensures that small improvements or degradations in the quality of service metrics are reflected accurately in the unified quality score. Also, the unified quality score may be different from previous solutions that rely on rule-based methods or mathematical models using linear weightings. The use of fuzzy logic to represent and process quality of service metrics allows for a more nuanced and continuous evaluation of quality of experience based on human-like reasoning. The previous use of discrete or binary outcomes may lead to significant score fluctuations near threshold values and potential inaccuracies. The unified quality score provides a continuous and accurate quality score that reflects subtle changes in quality of service metrics ensuring a more reliable assessment of overall quality of experience. This may result in a unified quality score that may be more realistic to quantify human perception.

The unified quality score also provides time and effort efficiency. The unified quality score also reduces subjectivity and complexity. A solution that depends heavily on subjective user ratings and extensive testing may be time-consuming and resource intensive. The unified quality score generation minimizes the need for subjective testing by leveraging fuzzy rules that are derived from judgments of users, which simplifies the evaluation process. Unlike subjective modeling, which relies on extensive subjective user ratings and complex experiments, metric generation system 108 transforms intuitive assessments into precise numerical values using fuzzy rules. This significantly reduces the need for large-scale user participation and associated logistical efforts. Also, storage to store the ratings from users is avoided. This process is highly scalable and can be easily adapted to different quality of service metrics and delivery conditions.

The unified quality score also includes a low computational complexity and cost. The fuzzy logic calculations performed by metric generation system 108 may be operations that use less computing resources, such as finding minimum values, applying membership functions, and calculating weighted averages. This results in a lower computational overhead compared to complex mathematical modeling. The method to determine the unified quality score is also highly scalable and can be easily adapted to different quality of service metrics and delivery conditions without requiring extensive computational resources or significant modifications to the existing framework.

System

Figure 6:
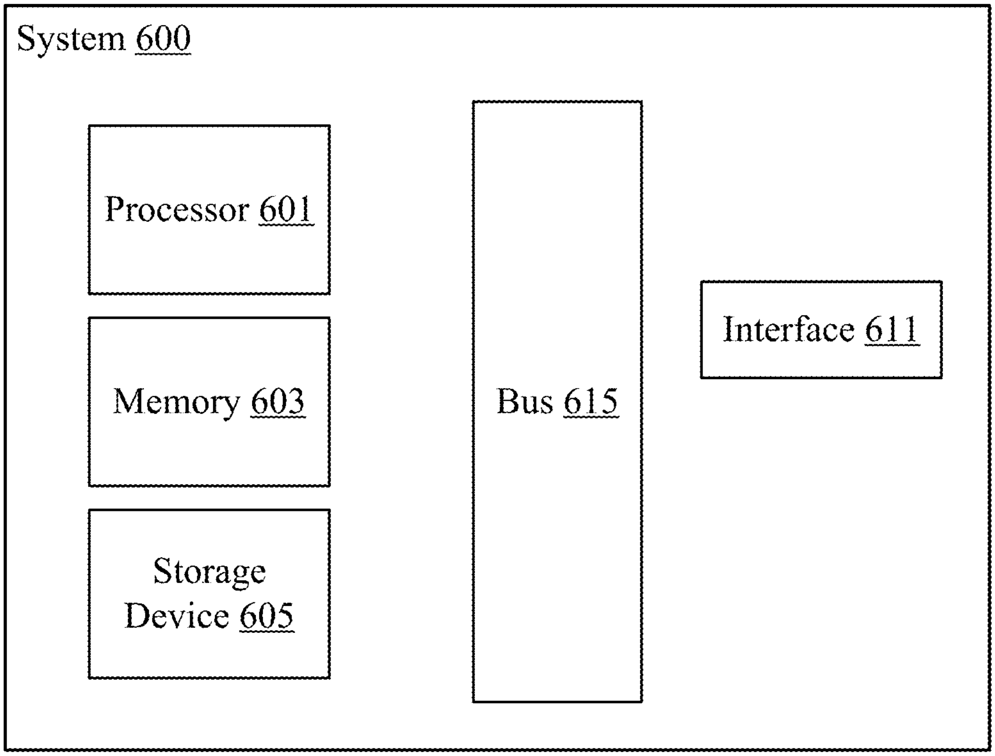
FIG. 6 illustrates one example of a computing device according to some embodiments.

FIG. 6 illustrates one example of a computing device according to some embodiments. According to various embodiments, a system 600 suitable for implementing embodiments described herein includes a processor 601, a memory 603, a storage device 605, an interface 611, and a bus 615 (e.g., a PCI bus or other interconnection fabric.) System 600 may operate as a variety of devices such as metric generation system 108, or any other device or service described herein. Although a particular configuration is described, a variety of alternative configurations are possible. Processor 601 may perform operations such as those described herein. Instructions for performing such operations may be embodied in memory 603, on one or more non-transitory computer readable media, or on some other storage device. Various specially configured devices can also be used in place of or in addition to processor 601. Memory 603 may be random access memory (RAM) or other dynamic storage devices. Storage device 605 may include a non-transitory computer-readable storage medium holding information, instructions, or some combination thereof, for example instructions that when executed by the processor 601, cause processor 601 to be configured or operable to perform one or more operations of a method as described herein. Bus 615 or other communication components may support communication of information within system 600. The interface 611 may be connected to bus 615 and be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:

receiving a plurality of metric values for quality of service based on delivering content in a content delivery system;

converting respective metric values into a fuzzy value in a plurality of possible fuzzy values, wherein a plurality of fuzzy values is determined;

determining a plurality of fuzzy rules, wherein a fuzzy rule is associated with a fuzzy value;

applying respective conditions for fuzzy rules in the plurality of fuzzy rules to the plurality of fuzzy values to determine one or more fuzzy rules that have conditions met, wherein a fuzzy rule applies when respective conditions for the fuzzy rule are met by one or more fuzzy values in the plurality of fuzzy values;

determining a fuzzy output from one or more fuzzy values that are associated with the one or more fuzzy rules that have conditions met;

calculating a unified quality score for a quality of experience based on the fuzzy output;

outputting the unified quality score, wherein the unified quality score is used to adjust the content delivery system; and adjusting a parameter in an encoder in the content delivery system to encode content differently based on the unified quality score.

2. The method of claim 1, further comprising:

categorizing multiple metric values into a category; and determining a metric value in the plurality of metric values for the category based on the multiple metric values.

3. The method of claim 2, wherein the metric value for a plurality of categories is used to determine the plurality of fuzzy values.

4. The method of claim 1, wherein converting respective metric values into the fuzzy value in the plurality of possible fuzzy values comprises:

applying a membership function for the respective metric values to determine a membership value for the fuzzy value.

5. The method of claim 4, wherein converting respective metric values into the fuzzy value in the plurality of possible fuzzy values comprises:

determining a membership value for respective fuzzy values in the plurality of possible fuzzy values based on the membership function.

6. The method of claim 5, wherein determining the membership value comprises:

determining the membership value for each of the plurality of possible fuzzy values.

7. The method of claim 1, wherein applying respective conditions for fuzzy rules in the plurality of fuzzy rules to the plurality of fuzzy values comprises:

determining which fuzzy rules in the plurality of fuzzy rules have conditions that apply to the plurality of fuzzy values.

8. The method of claim 7, wherein multiple fuzzy rules in the plurality of fuzzy rules are met.

9. The method of claim 7, wherein applying respective conditions for fuzzy rules in the plurality of fuzzy rules to the plurality of fuzzy values comprises:

determining a degree of membership for multiple fuzzy rules in the plurality of fuzzy rules that are met.

10. The method of claim 9, wherein:

the degree of membership is associated with multiple fuzzy values in the plurality of fuzzy values, and the degrees of membership for multiple fuzzy values is used to determine the fuzzy output.

11. The method of claim 1, wherein calculating the unified quality score based on the fuzzy output comprises:

converting the fuzzy output into a numerical value in a continuous range of values.

12. The method of claim 11, wherein the unified quality score is a single numerical value.

13. The method of claim 1, wherein calculating the unified quality score based on the fuzzy output comprises:

using a degree of membership for multiple fuzzy rules in the plurality of fuzzy rules that apply to the plurality of fuzzy values to determine a single numerical value for the unified quality score.

14. The method of claim 1, further comprising:

adjusting a parameter in a system in the content delivery system based on the unified quality score.

15. The method of claim 1, further comprising:

adjusting delivery of content via a content delivery network in the content delivery system based on the unified quality score.

16. The method of claim 1, further comprising:

adjusting playback of content at a media player based on the unified quality score.

17. A non-transitory computer-readable storage medium having stored thereon computer executable instructions, which when executed by a computing device, cause the computing device to be operable for:

receiving a plurality of metric values for quality of service based on delivering content in a content delivery system;

converting respective metric values into a fuzzy value in a plurality of possible fuzzy values, wherein a plurality of fuzzy values is determined;

determining a plurality of fuzzy rules, wherein a fuzzy rule is associated with a fuzzy value;

applying respective conditions for fuzzy rules in the plurality of fuzzy rules to the plurality of fuzzy values to determine one or more fuzzy rules that have conditions met, wherein a fuzzy rule applies when respective conditions for the fuzzy rule are met by one or more fuzzy values in the plurality of fuzzy values;

determining a fuzzy output from one or more fuzzy values that are associated with the one or more fuzzy rules that have conditions met;

calculating a unified quality score for a quality of experience based on the fuzzy output;

outputting the unified quality score, wherein the unified quality score is used to adjust the content delivery system; and adjusting a parameter in an encoder in the content delivery system to encode content differently based on the unified quality score.

18. The non-transitory computer-readable storage medium of claim 17, wherein converting respective metric values into the fuzzy value in the plurality of possible fuzzy values comprises:

applying a membership function for the respective metric values to determine a membership value for the fuzzy value.

19. The non-transitory computer-readable storage medium of claim 17, wherein calculating the unified quality score based on the fuzzy output comprises:

using a degree of membership for multiple fuzzy rules in the plurality of fuzzy rules that apply to the plurality of fuzzy values to determine a single numerical value for the unified quality score.

20. An apparatus comprising:

one or more computer processors; and a computer-readable storage medium comprising instructions for controlling the one or more computer processors to be operable for:

receiving a plurality of metric values for quality of service based on delivering content in a content delivery system;

converting respective metric values into a fuzzy value in a plurality of possible fuzzy values, wherein a plurality of fuzzy values is determined;

determining a plurality of fuzzy rules, wherein a fuzzy rule is associated with a fuzzy value;

applying respective conditions for fuzzy rules in the plurality of fuzzy rules to the plurality of fuzzy values to determine one or more fuzzy rules that have conditions met, wherein a fuzzy rule applies when respective conditions for the fuzzy rule are met by one or more fuzzy values in the plurality of fuzzy values;

determining a fuzzy output from one or more fuzzy values that are associated with the one or more fuzzy rules that have conditions met;

calculating a unified quality score for a quality of experience based on the fuzzy output;

outputting the unified quality score, wherein the unified quality score is used to adjust the content delivery system; and adjusting a parameter in an encoder in the content delivery system to encode content differently based on the unified quality score.

* * * * *